Sept. 6, 1932.   A. A. EISENMAN   1,875,330

UNION FITTING

Filed Aug. 29, 1928

Inventor
Arthur A. Eisenman
By G. W. Rebaldi
Atty.

Patented Sept. 6, 1932

1,875,330

UNITED STATES PATENT OFFICE

ARTHUR A. EISENMAN, OF MANITOWOC, WISCONSIN, ASSIGNOR TO EASTMAN MANUFACTURING COMPANY, OF MANITOWOC, WISCONSIN, A CORPORATION OF WISCONSIN

UNION FITTING

Application filed August 29, 1928. Serial No. 302,790.

This invention relates to union fittings designed and adapted for detachably connecting two tubular members.

Objects of the invention are to provide a union fitting of novel construction as regards the means for sealing the joint between the fitting members, whereby a joint is provided which will sustain relatively very high pressures without leakage; to provide a joint comprising a gland forming means for connecting the fitting members and a packing gasket for sealing the joint between the fitting members, in which the gasket will not enter the screw teeth or other connecting means on the interior of the gland, nor obstruct nor choke the bore of the fitting members, thus reducing the capacity flow therethrough; to provide a union fitting so constructed and arranged that the fitting members may conveniently be connected and disconnected by hand even under conditions requiring relatively very high pressures.

To effect the objects of the invention, my improved union fitting comprises the various features, combinations of features and details of construction hereinafter described and claimed.

In the accompanying drawing, in which my invention is fully illustrated—

Figure 1:
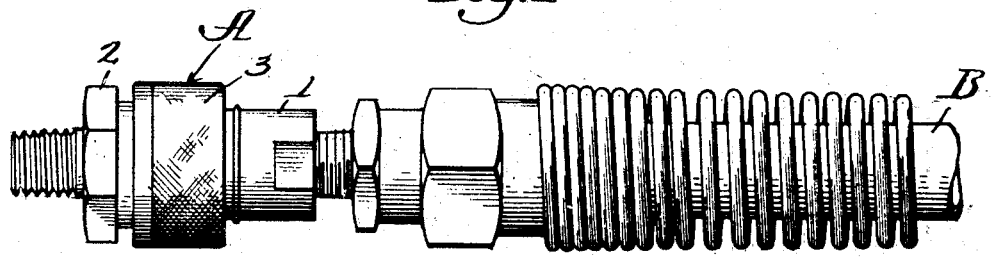
Figure 1 is a side view of a union fitting embodying my invention and improvements, showing a hose attached thereto.
Figure 2:
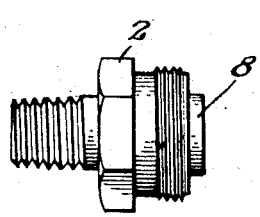
Figures 2 and 3 are detached side views, respectively, of different fitting members.
Figure 3:
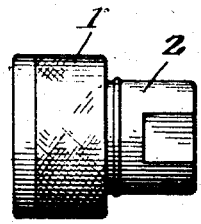
Figure 4:
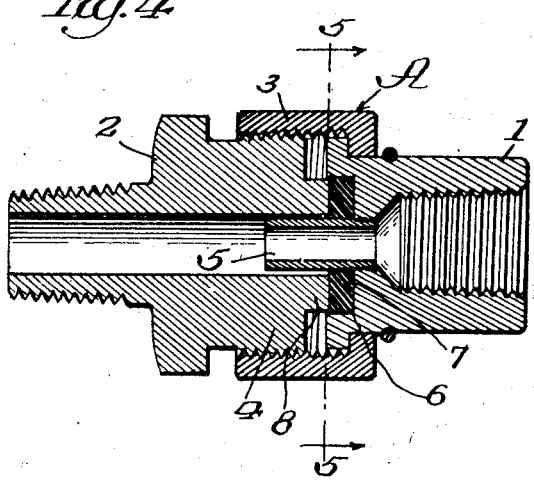
Figure 4 is an enlarged longitudinal sectional view through the axis of the fitting.
Figure 5:
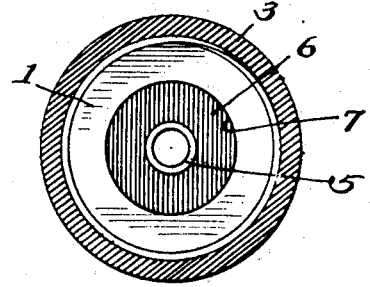
Figure 5 is a sectional view on the line 5—5 of Fig. 4.

For purposes of clear and definite illustration, I have, in the drawing, shown a union fitting, designated as a whole A, embodying my invention and improvements, as applied in use for connecting a tube B— which may exemplify the tube commonly provided at automobile service and filling stations for furnishing air under pressure for inflating pneumatic tires—to a fixed supply pipe, not shown.

In the drawing, I have shown my invention and improvements embodied in a familiar type of union fitting comprising tubular fitting members 1 and 2 adapted to be detachably connected by a screw thimble 3, which preferably—but not necessarily—is mounted to turn freely on one of said fitting members, as shown on the member 1, and is adapted for screw-threaded engagement with a part 4 of the fitting member 2.

As shown, also, the fitting A comprises what is known as an insert 5 consisting of a tubular axial projection on one of the fitting members, the outer end of which extends into the bore of the other fitting member. To provide for conveniently replacing it in case it becomes battered or jammed in use, said insert 5 preferably forms a separate part and has screw-threaded engagement with the end of the bore of the fitting member to which it is secured. As shown, said insert 5 is fixed to the fitting member 1, but if desired, may equally well be fixed to the member 2. Also, within the scope and contemplation of my invention, said insert may be formed integral with the part to which it is fixed.

The joint between the connected ends of the fitting members 1 and 2 is sealed by means of a packing gasket 6 of any suitable material, preferably rubber, seated in a recess 7 formed in the face of the member 1 concentric with the opening therein, said gasket also being provided with a hole adapted to fit snugly around the insert 5. Preferably, the thickness of the gasket 6 is substantially equal to the depth of the recess 7 and the diameter of said recess and of the gasket, is appreciably smaller than the inside diameter of the screw thimble 3.

Formed on the fitting member 2 and opposed to the gasket 6 is an axial projection 8 which is made sufficiently smaller than the diameter of the recess 7 that it will enter the same freely but with only slight clearance. The length of the axial projection will be so proportioned that when the fitting is assembled and the gland tightened to seal the joint between the fitting members 1 and 2, the entire force or pressure tending to draw said fitting members together, will be sustained by the gasket 6, thus insuring a tight joint. In practice, I have made the height of the axial projection 8 about equal to the depth of the recess 7.

With the described construction, it is obvious that under all operating conditions, the gasket 6 will be wholly confined in the recess 7, the wall of said recess preventing it from being squashed out into the threads formed in the side wall of the screw thimble 3, and the insert 5 preventing said gasket from being squashed inwardly so as to obstruct or choke the bore of the fitting member 1.

Also, by making the outside diameter of the screw thimble 3 of such size that it may be firmly gripped; knurling the outside thereof and making the screw threads connecting the same with the fitting member 2 of relative small pitch, say sixteen threads to the inch, the gasket 6 may be subjected to sufficient pressure to form tight joints between the fitting members to prevent leakage under all usual operating conditions, by turning said screw thimble by hand without the use of a wrench or other tool.

Excepting that the gasket 6 must be seated on the fitting member to which the insert 5 is secured, the sealing means for providing a tight joint between the fitting members, are to a large extent reversible. That is, the gasket 6 and insert 5 may, respectively, be seated in and secured to the fitting member 2 and the axial projection 8 formed on the fitting member 1.

Neither do I desire to limit myself to a screw-threaded screw thimble for connecting the fitting members, nor even to the use of a gland, as, if a screw thimble is used, other means for effecting relative advancement of the fitting members towards each other, will readily suggest themselves to skilled mechanics; while in many applications, it may be desirable to dispense entirely with the screw thimble and to employ some other form of connection.

I claim:

1. In a union fitting, the combination of tubular members adapted, respectively, for attachment to parts to be connected thereby, one of said members comprising an insert adapted to enter the bore of the other member, means for detachably connecting said members, adapted to advance them towards each other, and sealing means for preventing leakage at the joint between said members, comprising a gasket seated in a recess formed in the face of the member which carries said insert, said gasket being provided with a hole to receive said insert, and an axial projection on the other member adapted to enter said recess and subject said gasket to pressure, said insert forming a separate, detachable part and being proportioned so that its outer end will project through the gasket, the relation being such that when said fitting members are disconnected, the outer end of said insert will be accessible for engagement by a tool for detaching the same.

2. A tubular hose coupling comprising a fixed unit and a portable unit, said portable unit comprising a neck portion having a flange, a swivelling nut engaging said flange and having a female threaded nut portion extending beyond said flange, an annular recess in said flange of substantially less diameter than the flange, and a gasket retained in such recess and not projecting outside of such recess, and the fixed unit comprising a male threaded portion adapted to engage in the female threaded portion aforesaid, and an annular seat portion extending axially beyond said male threaded portion and adapted to fit both externally and internally within said recess, means being provided for preventing said swivelling nut from receding along the neck portion of said portable unit.

3. A tubular hose coupling comprising a fixed unit and a portable unit, said portable unit comprising a neck portion having a flange, a swivelling nut engaging said flange and having a female threaded nut portion extending beyond said flange, an annular recess in said flange of substantially less diameter than the flange, and a gasket retained in such recess, and the fixed unit comprising a male threaded portion adapted to engage in the female threaded portion aforesaid, and an annular seat portion extending axially beyond said male threaded portion and adapted to fit within said recess, said coupling comprising also a tubular insert secured in the portable coupling member and which projects through and beyond the packing gasket, and means for confining the female swivelling nut in operative position on the neck portion of the portable coupling unit.

4. In a union fitting, the combination of tubular members adapted, respectively, for attachment to parts to be connected thereby, one of said members comprising an insert adapted to enter the bore of the other member, means for detachably connecting said fitting members adapted to advance them towards each other and comprising a screw thimble mounted on the fitting member which carries said insert so as to turn freely thereon, and a male portion on the other fitting member, said members being provided, respectively, with interior and exterior threads adapted to interlock with each other, and sealing means for preventing leakage at the joint between said members, comprising a gasket seated in a recess in the face of the fitting member which carries the insert provided with a hole to receive said insert, and an axial projection on the other fitting member adapted to enter said recess and subject said gasket to pressure, the insert being proportioned so that its projecting end will be positioned entirely within the screw thimble forming part of the means connecting the fitting members.

In witness that I claim the foregoing as my invention, I affix my signature this 1st day of August, 1928.

ARTHUR A. EISENMAN.